Nov. 10, 1964   C. A. LONG   3,156,375
EXTERNAL PRESSURE SEAL FOR PRESSURE VESSELS
Filed Aug. 29, 1963
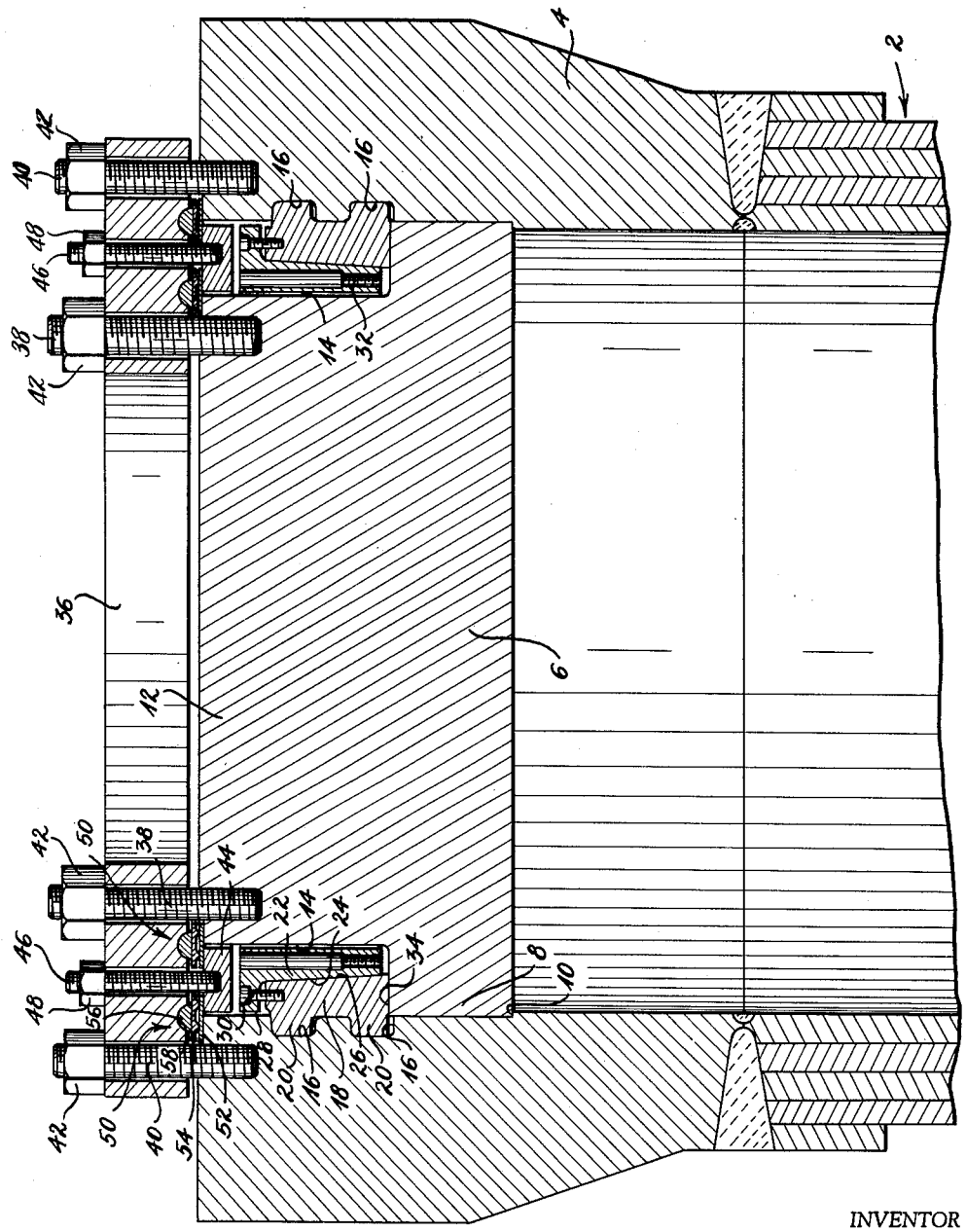
INVENTOR
Charles A. Long
BY
ATTORNEYS

United States Patent Office 3,156,375
Patented Nov. 10, 1964

3,156,375
EXTERNAL PRESSURE SEAL FOR PRESSURE
VESSELS
Charles A. Long, 205 W. Elm St., Titusville, Pa.
Filed Aug. 29, 1963, Ser. No. 305,263
6 Claims. (Cl. 220—46)

This invention relates to pressure seals particularly for use with vessels of large size containing gas or other fluids under very high pressure.

My prior Patent No. 2,545,290, dated March 13, 1951, shows and describes a self-equalizing pressure seal of the type employed in the present invention. In the structure shown in the prior patent, the entire pressure exerted against a closure for a vessel was applied through the seal. The arrangement disclosed therein is quite satisfactory for vessels of relatively small and intermediate sizes but for larger vessels the total pressure becomes too great for the seal structure. The present invention relates to an arrangement wherein the total pressure applied to the closure is reacted against means interlocking with the vessel shell and only a relatively small area is exposed to pressure within the vessel and applied to the sealing means whereby they are self-sealing and yet not exposed to excessive total pressure.

It is, therefore, an object of the present invention to provide a seal for high pressure vessels wherein the pressure within the vessel firmly seats the sealing means but wherein the sealing means are relieved of the total pressure applied to the closure being sealed.

Another object is to provide a sealing means of the type set forth wherein means are provided to apply initial pressure to the sealing means independently of the pressure within the vessel.

Still another object is to provide a seal of the type set forth wherein separate means are provided for locking the closure against opening under the influence of internal pressure and for initially setting the sealing means, all by way of members accessible from the exterior of the vessel.

A further object is to provide a seal of the type set forth which is relatively simple and economical to construct and highly efficient and reliable in operation.

Further and additional objects and advantages will become apparent to those skilled in the art as the description proceeds with reference to the accompanying drawing wherein the figure is a diametrical sectional view through a sealed closure embodying the present invention.

In the drawing, numeral 2 designates a generally cylindrical portion of a high pressure vessel, shown as being of laminated construction. An end shell member 4 is secured, as by welding, to the end of the vessel portion 2 and constitutes a generally cylindrical open end of the vessel. While the description herein will be with reference to a cylindrical vessel opening, it is to be understood that other shapes are contemplated and intended to be included herein.

A solid closure member 6 is provided with an inner flange portion 8 substantially completely closing the open end of the vessel portion 4. As shown, the portion 4 is provided with a small shoulder 10 against which the flange portion 8 is initially seated. The outer portion 12 of the closure 6 is of lesser diameter than the flange portion 8 and is spaced inwardly from the inner surface of the shell 4 to define an outwardly open channel 14. The inner surface of the shell portion 4 is provided with a pair of annular key grooves 16. While a pair of grooves are shown, it is contemplated that a single groove may be employed but the use of two or more grooves permits shallower grooves and a thinner wall section for the shell portion 4 while retaining the same strength. A locking ring 18 is provided with a pair of outer ribs 20 interlockingly engaging in the grooves 16 to thereby lock the ring 18 against outward axial movement. The ring 18 is formed of a plurality of separate segments, in themselves known to the art, which may be individually placed in the channel 14, then moved outwardly to engage their ribs 20 in grooves 16 to form a composite or sectional ring extending around the entire periphery of the closure. A retaining ring 22 is placed in the channel 14 inwardly of the locking ring 18 and engages the inner edge thereof to lock all of the segments of ring 18 in the position shown. The ring 22 is a single continuous ring and is provided with an outwardly flaring frusto-conical surface 24 at its outer edge complementary to a frusto-conical inner edge surface 26 of the ring segments 18. The retaining ring 22 is provided with a flange 28 overlying the outer ends of segments 18 and suitable means such as cap screws 30 to lock the retaining ring to the segments 18 and urge the ring 22 inwardly to firmly seat and lock the segments 18 in the illustrated position. If desired, the retaining ring 22 may be provided with threaded openings 32 adapted to receive a suitable pulling means when it is desired to disassemble the structure.

From the structure thus far described, it will be obvious that the locking ring 18 and retaining ring 22 serve to positively retain the closure 6 within the open end of the shell 4. It is to be noted that the outer surface 34 of the flange portion 8 bears directly against the inner end of retaining ring 18 so that the pressure applied to the inner face of closure 6 is transmitted through the surface 34 to the ring 18 and thence to the shell portion 4.

The structure so far described serves to retain the closure 6 in place against internal pressure but does not provide adequate sealing against the escape of gases or other fluids from the vessel. In actual construction, some clearance is provided between the described parts, which would permit pressure to leak into the channel 14.

To seal the vessel against any and all leakage the invention provides an external sealing arrangement which will now be described. A solid bridge ring 36 is formed of such dimension as to overlie and completely span across the outer end of channel 14 and to provide sufficient material inwardly and outwardly of the channel 14 to accommodate holding studs 38 and 40. The studs 38 are threadedly secured to the closure portion 12 and the studs 40 are threaded into openings in the end of shell portion 4. Nuts 42 on the studs 38 and 40 retain the bridge ring 36 in the described position but somewhat spaced outwardly from the ends of the shell 4 and closure portion 12. A pressure ring 44 fits fairly loosely within the channel 14 at the open end thereof and is provided with a plurality of outwardly directed studs 46 passing loosely through the bridge ring 36. Nuts 48 serve to draw the pressure ring 44 outwardly toward the bridge ring 36. It will be seen that any leakage of pressure from the interior of the vessel into channel 14 will be able to leak from the vessel only through the clearance spaces between pressure ring 44 and the shell 4 and closure portion 12, respectively. To seal those spaces against the escape of pressure, each is bridged by a sealing arrangement generally designated by numerals 50. The sealing arrangements 50 may be identical to the seals described in my earlier patent, referred to above, but in general, each comprises a flat packing ring 52 spanning the clearance to be sealed and a bearing ring 54 having spaced concentric ribs bearing on the packing ring opposite the generally coplanar surfaces on opposite sides of the clearance. An equalizing ring 56 of semi-circular cross sectional shape is arranged with its flat edge bearing against the bearing ring 54 and is wide enough to span the space between the ribs of the bearing ring. The outer arcuate surface of the equalizing ring 56 is seated in a complementary groove 58 in the bridge ring 36. Both sealing arrangements 50 may be identical and as shown are radially spaced apart to that the studs 46 may pass outwardly therebetween.

After the closure 6 is installed and locked in place by means of the locking ring 18 and retainer ring 22, the pressure plate 44 is then placed in the channel 14 and the sealing assemblies 50 placed in position thereover. Thereafter the bridge ring 36 is placed on studs 38 to engage the sealing assemblies in the manner shown and to project the studs 38, 40 and 46 outwardly therethrough. Finally, the nuts 42 and 48 are installed, the nuts 42 locking the bridge ring against outward movement and the nuts 46 to apply an initial sealing pressure, through pressure ring 44, to the sealing assemblies 50. Thus, initial sealing pressure can be applied to effect an initial seal even before pressure is introduced into the vessel. Alternatively, the pressure ring 44 and seals 50 may be assembled to the bridge ring 36 before the latter is placed on the studs 38 and 40. After fluid pressure is developed in the vessel, leakage thereof past the closure 6 will build up pressure in channel 14 but that pressure cannot leak past the seals 50 because of the initial sealing pressure thereon and is built up on the inner surface of the pressure ring 44. As the leakage pressure increases, the total pressure on ring 44 is increased and transmitted directly to the seals 50. As the pressure on pressure ring 44 varies or as the position of the outer surface of the closure portion 12 may vary slightly, the structure of the seals 50 permits them to accommodate to slight variations by rocking of the equalizer ring 56 in grooves 58 so as to maintain adequate and substantially equal sealing pressure on both the ribs of ring 54 at all times. This feature of the sealing means 50 is more fully described in my prior patent.

The sealing arrangement of the present invention does not prevent leakage past the flange portion 8 of the closure 6 and thus the entire periphery of the closure and the surfaces of the locking ring 18, retainer ring 22, shell 4 and pressure ring 44 are exposed to whatever gas is confined in the vessel. If that gas or other fluid is of a corrosive nature, the parts exposed thereto may, of course, be constructed of resistant materials such as stainless steel or the like. Obviously, assembly and disassembly of the entire closure and seal structures may be readily accomplished from the exterior of the vessel even to the extent of applying initial sealing pressure to the pressure ring 44, after all parts are in place.

While a single specific embodiment of the invention has been shown and described herein, it is to be understood that the same is merely exemplary of the principles involved and that other embodiments may be resorted to within the scope of the appended claims.

I claim:

1. In a pressure vessel: a generally cylindrical shell portion having an open end; a closure in said open end and having an inner flange portion substantially closing said open end and an outer portion of less diameter than said open end of said shell and defining an outwardly open channel therebetween; a locking ring in said channel interlockingly engaged with said shell and held thereby against axial movement; said inner flange portion of said closure having an outer surface bearing directly on said locking ring to lock said closure in said open end; an annular pressure ring in the outer end of said channel; an annular bridge ring radially spanning the open end of said channel and being fixed to said vessel; concentric sealing means, each bearing against said bridge ring, one of said sealing means sealingly engaging adjacent portions of said closure and said pressure ring and the other sealingly engaging adjacent portions of said shell and said pressure ring; and selectively operable pressing means for moving said pressure ring outwardly toward said bridge ring to apply initial sealing pressure to both said sealing means.

2. A pressure vessel as defined in claim 1 wherein said locking ring comprises a plurality of arcuate segments having at least one radial flange engaging in an inwardly facing groove in said shell; an annular retaining ring in said channel radially inwardly of said segments and locking the same against radial inward movement; and means releasably securing said retaining ring to said locking ring.

3. A pressure vessel as defined in claim 2 wherein the radially inner edge of said locking ring and the radially outer edge of said retaining ring define complementary frusto-conical surfaces flaring outwardly toward said retaining flange portion; said last named means comprising a plurality of threaded elements for drawing said retaining flange portion axially toward said locking ring.

4. A pressure vessel as defined in claim 1 wherein said bridge ring is secured to said vessel by threaded means extending through the radially inner and outer portions thereof and respectively secured to said closure and to the outer end of said shell.

5. A pressure vessel as defined in claim 1 wherein said concentric sealing means are radially spaced apart and said selectively operable pressing means comprise threaded elements secured to said pressure ring and extending outwardly therefrom, between said concentric sealing means and through said bridge ring.

6. A pressure vessel as defined in claim 1 wherein said adjacent portions of said shell and said pressure ring comprise substantially coplanar axially facing annular surfaces and wherein said adjacent portions of said pressure ring and said closure comprise substantially coplanar axially facing annular surfaces; each of said concentric sealing means comprising a flat packing ring spanning the joint between its associated coplanar surfaces; a bearing ring having concentric ribs bearing against said packing ring opposite said coplanar surfaces, respectively; and an equalizing ring of semicircular cross-sectional shape arranged with its flat edge bearing against said bearing ring, spanning the space between said concentric ribs and with its arcuate surface seating in a complementary annular groove in said bridge ring.

References Cited in the file of this patent

UNITED STATES PATENTS

| | | |
|---|---|---|
| 2,237,029 | Fisher | Apr. 1, 1941 |
| 2,690,275 | Alt et al. | Sept. 28, 1954 |
| 2,690,276 | Alt | Sept. 28, 1954 |
| 2,729,491 | Sieder | Jan. 3, 1956 |